United States Patent Office 3,457,300
Patented July 22, 1969

3,457,300
ACETIC ACID TYPE COMPOUNDS
Conrad P. Dorn, Plainfield, and Tsung-Ying Shen, Westfield, N.J., assignors to Merck & Co., Inc., Rahway, N.J., a corporation of New Jersey
No Drawing. Filed June 11, 1965, Ser. No. 463,339
Int. Cl. C07c 63/54, 69/76, 63/52
U.S. Cl. 260—515                    12 Claims

ABSTRACT OF THE DISCLOSURE

Substituted p-cyclohexyl substituted phenyl acetic acids and derivatives are prepared from the corresponding acyloxycyclohexylphenyl ketones. These compounds have a useful degree of anti-inflammatory activity and in the treatment of conditions which are responsive to such agents.

---

This invention relates to new phenyl aliphatic acids, aldehydes, alcohols, and derivatives thereof. More specifically, this invention relates to a p-cycloalkyl m-substituted phenyl acetic acid and the esters and amides thereof, as well as to the corresponding aldehydes, alcohols, acetals, ethers, and non-toxic salts thereof.

The field of anti-inflammatory compounds in the past two decades has seen the development of many new drugs. Most of these have been steroids of the 11-oxygenated pregnane series, which, while highly effective, cause undesirable side effects. There continues to be a need for equally effective compounds of much simpler structure and having less side effects. It is a principal object of this invention to provide one series of such compounds. The above and other objects of this invention are accomplished by the provision of compounds described by the formula:

<chemical structure> in which

R is alkoxy, hydroxy, keto, amino, and alkylamino (primary and secondary or an olefinic bond between the 3'- or 4'-positions of cyclohexyl moiety), R preferably being substituted at the 3'- or 4'- or 2',4'-positions; the 4' position being especially preferred.

$R_m$ preferably is halogen, trihalomethyl, amino, di(lower alkyl) amino, nitro, lower alkylsulfonyl, di(lower alkyl)sulfamyl, and hydroxy, but may be other groups, such as lower alkoxy, lower alkylthio, mercapto, cyano, carboxamido, and lower alklanoylamino, at least one of said $R_m$ being in the meta position;

$R_{a1}$ is hydrogen;

$R_{a2}$ is lower-alkyl, and when taken together, $R_{a1}$ and $R_{a2}$ are methylene or ethylidene; and X may be COOH; COOR, where R may be lower-alkyl, lower-alkenyl, lower-alkynyl, cyclo lower-alkyl, phenyl, lower-alkanoylaminophenyl, carboxyphenyl, carboxamidophenyl, lower alkoxy, lower alkyl, cyclo lower-alkoxy lower-alkyl, di(lower-alkyl)amino lower-alkyl, hydroxy lower-alkyl, di(lower-alkyl)amino lower-alkyl, and cyclo lower-alkylamino lower-alkyl; $CONH_2$;

$$\begin{array}{cc} Y & Y \\ | & | \\ CON, & CON \\ | & | \\ Y & H \end{array}$$

where Y may be lower-alkyl, hydroxy, lower-alkyl, poly hydroxy lower-alkyl, phenyl lower-alkyl, phenyl, lower-alkoxyphenyl, halogenophenyl, trifluoromethylphenyl, cyclohexyl, carbobenzyloxymethyl, carboxymethyl, 1-carboxyl-3-carbamyl-propylamino, N-dilower-alkyl-carboxamidmethyl, N-di-lower, alkylamino-lower-alkyl, N-lower-alkyl-pyrrolidyl, N-lower-alkylpyrrolidyl-lower-alkyl, or Y may form a heterocyclic group with the nitrogen when Y is the group —$CH_2$—$CH_2$—O—$CH_2$—$CH_2$, $$-CH_2-CH_2-\underset{\underset{R_1}{|}}{N}-CH_2-CH_2-$$

in which $R_1$ is lower-alkyl,

—$CH_2$—$CH_2$—NH—$CH_2$—$CH_2$—

<chemical structure with phenyl>

$CH_2$—$CH_2$—$CH_2$—$CH_2$, $$-CH_2-CH_2-\underset{\underset{CH_2-CH_2OH}{|}}{N}-CH_2-CH_2$$

and

—$CH_2$—$CH_2$—$CH_2$—$CH_2$—$CH_2$; $CH_2OH$;

$CH_2OR_3$ where $R_3$ is alkyl; CHO; $CH(OR)_2$ where $R_2$ is alkyl; the pharmaceutically non-toxic salts may be the ammonium, alkali and alkali earth, amine, magnesium, aluminum iron salts, and the like.

In one embodiment, this invention relates to compounds wherein the 3-position is substituted with an $R_m$ group. In addition, the trihalomethyl group indicated in $R_m$ may only be placed on the 3-position of the phenyl ring. The above-mentioned aspects of this invention apply equally to compounds wherein X is as previously defined.

In the more preferred aspects of this invention, X is represented by a carboxyl group $R_{a1}$ by hydrogen, and $R_{a2}$ by methyl, or $R_{a1}$ and $R_{a2}$ taken together by methylene. $R_m$ is represented by the groups previously mentioned (especially halogen), and restricted to the 3-position of the phenyl ring.

The compounds of this invention have a high degree of anti-inflammatory activity and are effective in the prevention and inhibition of granuloma tissue formation. Certain of them posses this activity in high degree and are of value in the treatment of arthritic and dermatological disorders and in like conditions which are responsive to treatment with anti-inflammatory agents. In addition, the compounds of this invention have a useful degree of antipyretic and analgesic activity and also indicate some fatty acid synthesis inhibition. For these purposes, they are normally administered orally in tablets or capsules, the optimum dosage regimen depending, of course, on the activity of the particular compound being used, the type and severity of the condition being treated and the reaction sensitivity of the patient. Although the optimum quantities of these compounds of this invention to be used in such manner will depend on the compound employed and the particular type of disease condition treated, oral dose levels of preferred compounds in the range of 1.0–2,000 mg. per day are useful in control of pain, fever and/or inflammation.

Since the phenyl acetic acid compounds of this invention possess asymmetric carbon atoms, they are ordinarily present in the form of a racemic mixture. The resolution of such racemates can be carried out by a vast number of known methods. Thus, some racemic mixtures can be precipitated as eutectics instead of mixed crystals and can thus be quickly separated and in such cases can sometimes be selectively precipitated. The more common method of chemical resolution is, however, greatly preferred. By this method diastereomers are formed from the racemic mixture by reaction with an optically-active resolving agent. Thus, an optically-active base can be reacted with the carboxyl group. The difference in solubility between the diastereomers formed permits the selective crystallization of one form and regeneration of the optically-active acid from the mixture. There is, however, a third method of resolving which shows great promise. This is one or the other forms of biochemical procedures using selective ensymatic reaction. Thus, the racemic acid can be subjected to an asymmetric oxidase or decarboxylase which will, by oxidation or decarboxylation, destroy one form, leaving the other form unchanged. Even more attractive is the use of a hydrolysase on a derivative of the racemic mixture to form preferentially one form of the acid. Thus, esters or amides of the acids can be subjected to an esterase which will selectively saponify one enantiomorph and leave the other unchanged.

When the free acid is resolved into (d) and (l) enantiomorphs, the anti-inflammatory activity is found to reside virtually completely in the (d) isomer. The desired (d) isomer of the free acid may be prepared by any one of the preceding described resolving methods, preferably working from the free acid as the starting material. For example, amide or salt diastereomers of the free acid may be formed with optically-active amines, such as quinine, brucine, cinchonidine, cinchonine, hydroxyhydrindamine, menthylamine, morphine, α-phenylethylamine, phenyloxynaphthylmethylamine, quinidine, 1 - fenchylamine, strychnine, basic amino acids such as lysine, arginine, amino acid esters, and the like. Similarly, ester diastereomers of the free acid may be formed with optically-active alcohols, such as borneol, menthol, 2-octanol and the like. Especially preferred is the use of cinchonidine to give the readily decomposable diastereomer salt which may then be resolved by dissolving in a solvent, such as acetone, and distilling the solvent at atmospheric pressure until crystals begin to appear and further crystallization produced by allowing the mixture to cool to room temperature, thereby separating the two enantiomorphs. The (d) acid may then be recovered from the (d) salt by extracting the salt between an inorganic solvent, such as petroleum ether, and dilute hydrochloric acid.

Derivatives of the resolved (d) form of the free acid then may be prepared in the usual way. These derivatives generally are more active than racemates of the same compounds. Consequently, the (d) form of these compounds, substantially free of the (l) form, is another embodiment of this invention.

The compounds of this invention can be prepared from an acyloxy cyclohexyl acetophenone (or propiophenone) (hereinafter both called ketone) starting material compound of the formula:

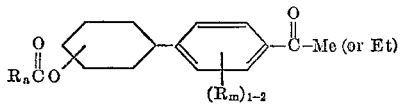

wherein $R_a$=alkyl (preferably lower-alkyl) and aryl (preferably phenyl) and the

group is preferably substituted at the 4' position. All of the starting materials, with the exception of m-trihalomethyl substituent, can be prepared by nitrating the o,m-unsubstituted ketone and subsequently converting the nitro ketone compounds to the desired $R_m$ substituents. It is to be understood, however, that the conversion of the nitro group may also be accomplished at various stages along the way toward producing the final compound. For example, when a 3-substituted compound is desired, 3-nitro ketone compound (prepared by nitration of the unsubstituted ketone) is converted, when desired, to the corresponding 3-$R_m$ substituents by appropriate reactions. For example, the nitro compound is reduced in the presence of palladium under an atmosphere of hydrogen to form the 3-amino compound. This amino compound may be reacted with an organic halide, such as methyl iodide, to form the mono and disubstituted amino compound or acylated to form a 3-alkanoylamino compound. The amino compound may be diazotized and the diazo replaced by hydroxyl group, which in turn may be alkylated to form a 3-lower-alkoxy compound. The diazonium salt derived from the amino compound may also be treated with ethyl xanthate followed by saponification of the xanthate under alkaline conditions to give the mercapto compound, which may, if desired, then be alkylated under suitable conditions with a dialkylsulfate or alkyl halide to the alkylmercapto compound. Also, the diazonium compound may be reacted with a cuprous halide in the cold under acid conditions to form the 3-halide compound or reacted with cuprous cyanide to form a 3-cyano compound, which may then be hydrolyzed under suitable conditions to form a 3-aminocarbonyl compound.

When it is desired to obtain more than one $R_m$ group on the phenyl moiety, another procedure can be used. For example, the ketone is nitrated in the 3-position, reduced to the corresponding 3-amino compound and acylated (i.e., acetic anhydride) to the 3-acylamido compound. At this point the 3-acylamide compound is again nitrated (i.e., using fuming nitric acid and concentrated sulfuric acid) to yield a mixture of the 3-acylamido 5-nitro, 3-acylamido-2-nitro and 3-acylamido-6-nitro ketone compounds. These isomers are then separated by chromatography. Each of these isomers may then be hydrolyzed to give the corresponding 3-amino group, which may be further reacted as previously indicated to yield the desired 3-substituent. Alternatively, the 3-acylamido may remain and the nitro substituent reacted as previously described to yield the desired 2,5, or 6 substituted compound. Similarly, the 3-acylamido and nitro groups may be reacted in any desired order to obtain the various substituent desired on the 3,5, 2,3 and 3,6 positions of the ketone moiety. Furthermore, the above reaction may be carried out at any other suitable step along the synthesis of the final compounds.

Acyloxycyclohexylacetophenone and the other ketone starting materials of this invention may be prepared by the acetylation of an hydroxycyclohexylbenzene, for example, in the presence of an acid anhydride and sulfuric acid to produce the desired acetoxycylohexylbenzene, which can generally be substituted via a Friedel-Crafts condensation with, for example, an acid halide to produce the desired ketone starting material. Exemplary is the preparation of 4'-(4" - acetoxycyclohexyl)acetophenone, starting from 4-phenylcyclohexanol (E. L. Eliel et al., JACS 79:5992, 1957) by reaction with acetic anhydride and sulfuric acid. By reaction thereof with excess acetic anhydride in the presence of catalytic amount of sulfuric acid is produced 4-acetoxy - 1 - phenylcyclohexane, which after a routine work-up with drying is then reacted with excess acetyl chloride and about a 2 molar excess of aluminum chloride in carbon disulfide to produce good yields of the desired 4'-(4"-acetoxycyclohexyl)-acetophenone. Similarly, there is produced 4'-(4"-benzoyloxycyclohexyl)propiophenone by substitution of benzoic anhydride for acetic anhydride and propionyl chloride for acetyl chloride in the foregoing. Likewise, 4'-(4"-propionoxycyclohexyl)acetophenone is produced by the use in the foregoing procedure of propionic anhydride in place of acetic anhydride and the reaction of the acyloxyphenylcyclohexane produced with the acetyl halide in a Friedel-Crafts reaction.

Exemplary of other procedures for preparing the ketones of this invention are:

(A)

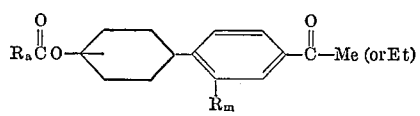

A Friedel-Crafts reaction of benzene with an acyloxycyclohexyl halide to obtain an acyloxycyclohexyl benzene compound and an additional Friedel-Crafts reaction using the said acyloxycyclohexyl benzene compound and a lower-alkyl acid chloride to form the corresponding p-substituted ketone. The ketone is then placed in concentrated sulfuric acid maintained below room temperature and the resulting solution reacted with fuming nitric acid or the ketone reacted directly with fuming nitric acid to form the 3-nitro-4-cyclohexyl ketone. The 3-nitro ketone compound may then be converted to the desired $R_m$ as described in cols. 4 and 5.

(B)

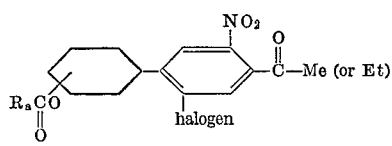

The 3-nitro ketone compound obtained from A above is placed in an inert solvent, such as ethanoldioxane, and reduced with platinum oxide at room temperature under an atmosphere of hydrogen. The solution is then treated with gaseous hydrogen chloride and the amine salt thus obtained is placed in a solution of concentrated hydrochloric acid in water and maintained at below ambient temperatures. A solution of sodium nitrite is then added followed by a solution of cuprous chloride and the reaction mixture stirred to obtain a 3-chloro ketone compound. The 3-chloro compound is then nitrated at the 6-position as previously described in A to obtain a 3-chloro-6-nitro ketone compound, which, if desired, may be reacted as similarly described in cols. 4 and 5 to the 2-$R_m$-5-halo keto compounds.

The ketone compounds which have been prepared as previously described may be used as the starting material for the preparation of the substituted-cyclohexyl substituted-phenyl acetic acid (and derivatives thereof), compounds of this invention. The following Flow Sheets indicate the sequence of steps required for the preparation of all the compounds of this invention and the description which follows indicates the reactions and reaction conditions necessary to prepare these novel compounds.

FLOW SHEET I

Process of this Invention ($R_b$ = hydroxy or acyloxy)

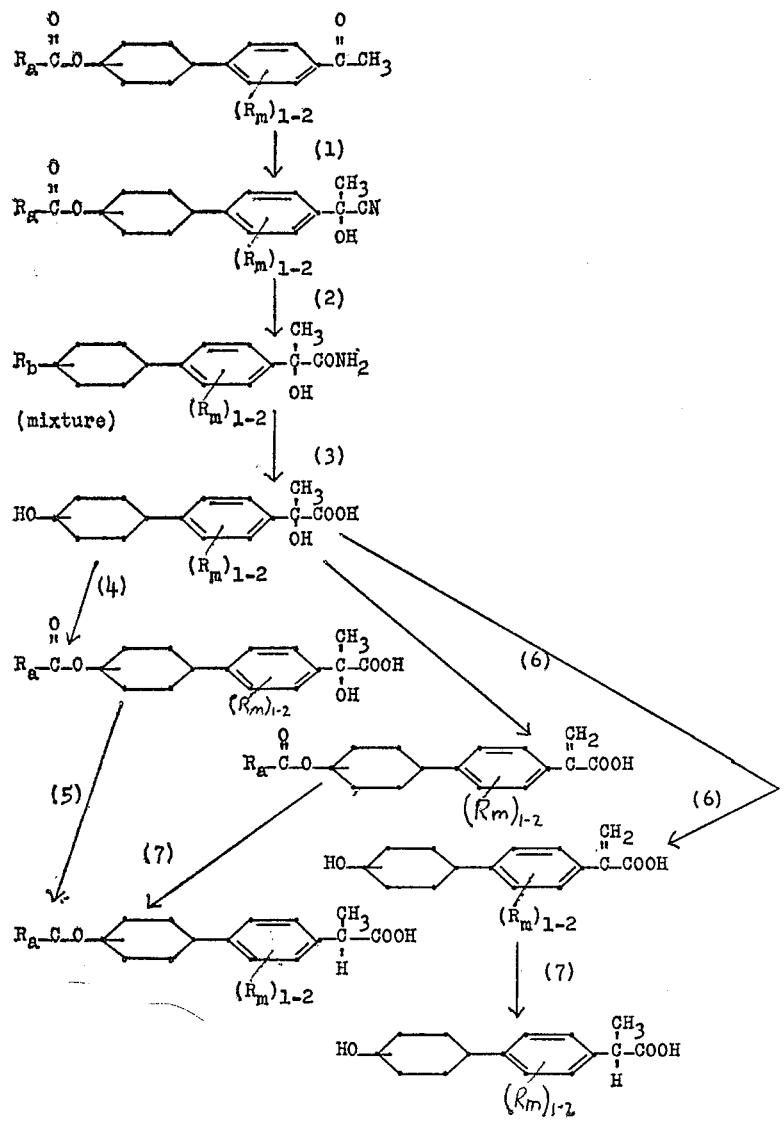

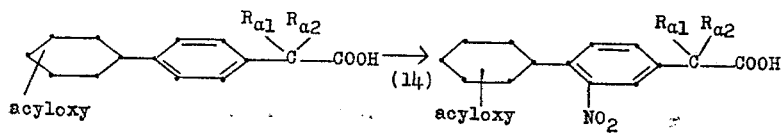

FLOW SHEET II ($R_b$ = acyloxy or hydroxy)

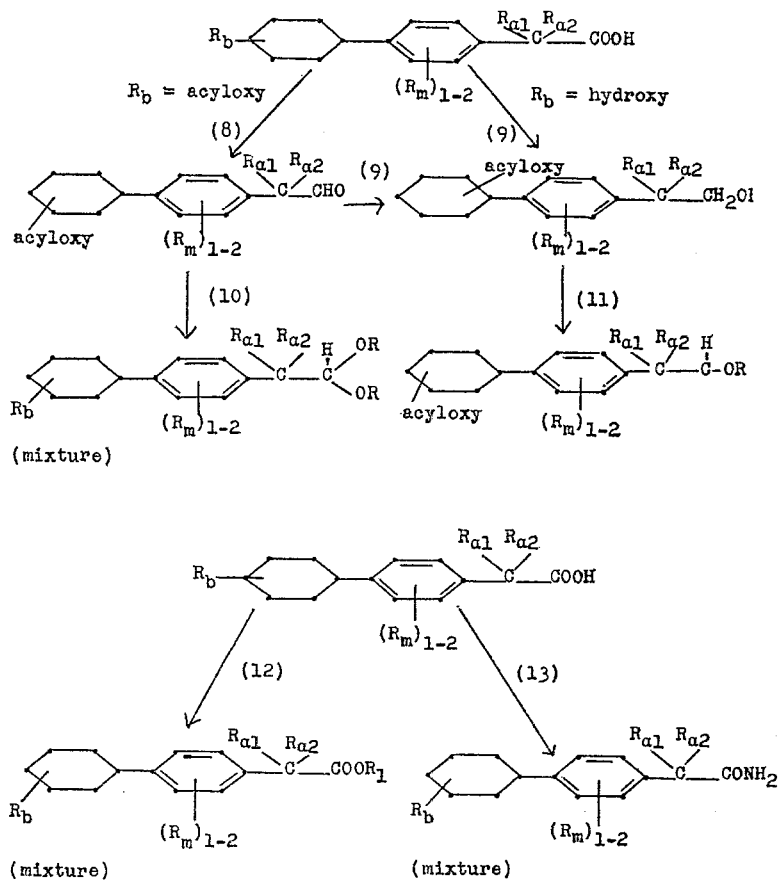

EQUIVALENTS

As those previously mentioned, including the appropriate restrictions.

REACTIONS AND CONDITIONS

Step (1)

Reaction with a cyano compound, such as sodium cyanide, potassium cyanide, hydrogen cyanide, lower ketone cyanohydrin, and the like (preferably hydrogen cyanide with an amine such as a primary, secondary, or tertiary aliphatic amine (ethylamine, propylamine, diethylamine, and trimethylamine) in a solvent such as lower alkanols (methanol, ethanol, propanol, and the like), liquid hydrogen cyanide, ether, dioxane, tetrahydrofuran, water, mixtures of water and the above organic solvents, lower alkanoic acids (acetic, propionic, and the like), and mixtures of the acids and above solvents, preferably, however, using liquid hydrogen cyanide as the reactant as well as the solvent, at any suitable temperature, preferably 45–100° C., but especially 75–85° C., until the reaction is substantially complete.

Step (2)

Reaction by methods well known in the art, such as reaction under acid conditions. Preferably, reaction with a mineral acid (hydrogen chloride, hydrogen bromide, sulfuric acid, phosphoric acid, and the like, preferably fortified hydrochloric acid) in an inert solvent, such as lower alkanols (methanol, ethanol, propanol), ether, dioxane, tetrahydrofuran, and the like, preferably employing the acid as the solvent also, between temperatures of 0° and 50° C., preferably at or below ambient temperatures, until the reaction is substantially complete.

Step (3)

Acid or basic reaction by methods well known to the are. Preferably, reaction with aqueous alkali or alkali earth hydroxides, such as sodium, potassium, barium, lithium, and strontium hydroxides, or non-aqueous alkali and alkali earth hydroxides with lower alkanols (methanol, propanol, and the like), ethylene glycol, and the like, aqueous ammonium hydroxide, organic amines (such as lower aliphatic amines), and the like, preferably aqueous sodium or potassium hydroxide, but especially concentrated aqueous sodium hydroxide (6–12 N) using the above aqueous hydroxides as the solvents, preferably using the aqueous hydroxide reactants as solvents also, at any desirabl temperature (0° C. to reflux), preferably at on near reflux, until the reaction is substantially complete.

Step (4)

Reesterification of the hydroxy substituent on the cyclohexyl moiety using well known conditions, such as acid anhydrides under reflux in inert solvents, i.e. benzene, toluene, the anhydride itself and the like.

Step (5)

Reduction by means well known to the art, i.e., hydrogenation with palladium under acid conditions with phosphorus and iodine and the like. Preferably however, reaction with an acid such as lower aliphatic acids (acetic acid, propionic acid, and the like), aromatic acids, inorganic acids, such as phosphoric acid, hydrochloric acid, and the like, and with phosphorus and iodine or hydrogen iodine, preferably phosphorus and iodine, using the above acids as solvents also or in ether, dioxane, tetrahydrofuran, and the like, preferably the above acids as solvents at any suitable temperature (room temperature to 150° C., preferably 100–120° C.) until the reaction is substantially complete.

Step (6)

Acid catalyzed dehydration, or formation of the ester of the α-OH with an organic or inorganic acid, followed by pyrolysis, or basic treatment by methods well known to the art. Preferably, the reaction is carried out in an acid medium using strong acids such as toluenesulfonic acid, p-nitrobenzenesulfonic acid, benzenesulfonic acid, trichloroacetic acid, a mixture of acetic acid and sulfuric acid, and the like (preferably toluenesulfonic acid) in an inert solvent such as aromatic compounds (benzene, toluene, xylene, and the like), dioxane, tetrahydrofuran, lower alkanoic acids (acetic acid, propionic acid, and the like), preferably acetic acid or tetrahydrofuran at elevated temperatures (75–150° C., preferably at or near the reflux temperature of the system) until the reaction is substantially complete.

Step (7)

Reduction of an α-alkylidene to the corresponding α-lower alkyl, by methods well known to the art. Preferably, reduction over a catalyst such as palladium, platinum, or Raney nickel, especially 5–10% palladium oxide under moderate hydrogen pressure (5–60 pounds, preferably 40 pounds) in an inert solvent such as lower alkanols (methanol, ethanol, butanol, and the like), aromatic compounds (benzene, toluene, xylene, and the like), tetrahydrofuran, dioxane, acetic acid, and the like at any suitable temperature (0° C. to the reflux temperature of the system, preferably at room temperature) in ethanol until the reaction is substantially complete. Thus is exemplified the preparation of the free acid having either a free hydroxy or an acyloxy (i.e. acetoxy, benzoxy, lower-alkanoyloxy, and the like) substituted on the cyclohexyl moiety. From these compounds the various novel acid derivatives of this invention can be prepared by appropriate means, followed by conversion of the hydroxy or acyloxy substituents on the cyclohexyl moiety to the R group defined above. The preceding Flow Sheet II is further illustrative of this embodiment of this invention.

Step (8)

Reduction of an acid to its corresponding aldehyde, by methods well known to the art. Preferably, reaction with a compound such as thionyl chloride, thionyl bromide, phosphorus pentachloride, phosphorus pentabromide, phosphorus oxychloride, phosphorus oxybromide, and the like, preferably thionyl chloride, in an inert solvent such as benzene, toluene, xylene, ethers (diethyl ether, dioxane), tetrahydrofuran, and the like, preferably benzene or toluene at any suitable temperature (room temperature to reflux, preferably at or near the reflux temperature of the system) until the formation of the acid halide is substantially complete; preferably subsequent removal of the hydrochloric acid and sulfur dioxide thus formed and reaction of the acid halide with a Rosenmund catalyst such as 5% palladium on $BaSO_4$ with quinoline gives the acyloxy cyclohexyl aldehyde. Use of a tritertiarybutoxy alkali or alkali earth aluminum hydride such as potassium, sodium, and lithium aluminum hydride and the like, preferably reduction with tritertiarybutoxy alkali and alkali earth aluminum hydrides, but especially tritertiarybutoxy lithium aluminum hydride in an inert solvent such as benzene, toluene, xylene, ethers (diethyl ether, dioxane, and the like) and tetrahydrofuran, preferably tetrahydrofuran or ether at any suitable temperature (−80° C. to room temperature), preferably −35° to −15° C., until the reaction is substantially complete gives the hydroxy cyclohexyl derivative.

Step (9)

Reduction of the hydroxy cyclohexyl acid or the aldehyde compound by methods well known to the art. For example, reduction with an alkali or alkali earth aluminum hydride, such as lithium, potassium, sodium, and the like. Preferably 200–400% excess lithium aluminum hydride in an inert solvent such as tetrahydrofuran, diethyl ether, and the like, preferably ether, at any suitable temperature (−15° C. to reflux, preferably 0° C. to ambient temperatures) until the formation of the alcohol salt is substantially complete followed by addition of a material to consume the excess hydride such as water, lower alkanols, dilute mineral acids (hydrochloric acid, hydrobromic acid, sulfuric acid, and the like), preferably addition of water followed by a dilute mineral acid (hydrochloric acid, hydrobromic acid, sulfuric acid, and the like), especially water and dilute sulfuric acid, at any suitable temperature, ambient temperatures preferred, until the reaction is substantially complete.

Step (10)

Reaction with a lower alkanol under an acid catalyst, by methods well known to the art. For example, reaction with a strong acid such as toluenesulfonic acid, p-nitrobenzenesulfonic acid, benzenesulfonic acid, trichloroacetic acid, mineral acids (hydrochloric acid, hydrobromic acid, sulfuric acid, and the like), boron trifluoride and the like. Preferably reaction with a catalytic amount of toluenesulfonic acid or concentrated hydrochloric acid and with a lower alkanol (methanol, ethanol, propanol, butanol, and the like, preferably methanol) using the alcohols as solvents or combinations of the alcohols and ethers or aromatic compounds at any suitable temperature (0° C. to reflux, preferably ambient temperatures) until the reaction is substantially complete.

Step (11)

Etherification by methods well known to the art. For example, etherification by using an alcohol, alkyl halide, alkyl sulfate and the like. Preferably, reaction with a lower alkyl halide and a strongly basic condensing agent such as sodium hydride, potassium hydride, potassium hydroxide, potassium tertiary butoxide, sodamide, and the like (preferably sodium hydride) and a lower alkyl halide such as methyl iodide, propyl iodide, methyl bromide, ethyl bromide, and the like (preferably 50% excess of methyl iodide) in any non-active hydrogen solvent such as aromatic solvents (benzene, toluene, xylene, and the like), ethers (diethyl ether, dioxane, tetrahydrofuran, and the like), dimethylformamide and the like, preferably dimethylformamide, at any suitable temperature (0–50° C., preferably ambient temperatures) until the reaction is substantially complete.

Step (12)

Esterification by any methods well known to the art. Preferably, reaction with a strong acid such as hydrochloric acid, sulfuric acid, toluenesulfonic acid, p-nitrotoluenesulfonic acid, benzenesulfonic acid and the like (preferably 1–3% concentrated sulfuric acid) and with an appropriate alcohol (lower alkanols, ar-lower alkanols and the like; especially a lower alkanol such as methanol or ethanol) using the alcohol as solvent also or using an inert solvent such as tetrahydrofuran, ether, and dioxane at any suitable temperature and time.

Step (13)

Amidation reaction by any method well known to the art. Preferably, reaction with thionyl chloride, thionyl bromide, phosphorus oxychloride, phosphorus oxybromide phosphorus pentachloride, or phosphorus pentabromide in an inert solvent such as ether, benzene, toluene, xylene, tetrahydrofuran, dioxane, and the like to form the acid halide, followed by reaction with an excess of the amine at any suitable temperature (0° C. to room temperature preferred); or reaction with dicyclohexylcarbodiimide and an excess of the amine at any suitable temperature until the reaction is substantially complete. The amine, may be ammonia, a lower alkyl amine, an ar-lower alkyl amine and the like. Preferably however, ammonia or a lower alkyl amine.

Step (14)

Preparation of the acid halide as indicated in Step (12) and reaction of the halide with a lower alkanol to form an ester followed by reaction of the ester thus obtained with concentrated sulfuric acid and fuming nitric acid, then saponification of the nitro ester to the free acid.

In Step (1) when it is desired to employ the cyanide salt, it is necessary to have the reaction mixture at a pH below 7. This is necessary in order to have the cyanide salt react as the acid. When the preferred procedure is used, namely, using hydrogen cyanide, the use of an amine, preferably a tertiary amine, is highly preferred, although not absolutely necessary.

In Step (2), an acid condition is necessary to obtain this reaction, and those acids as previously indicated may be used. The reaction may be run above a temperature of 50° C. However, when higher temperatures are used, a mixture of the desired compound as well as the alkylenyl acid is obtained, and it is possible that the reaction may be run at temperatures wherein only the alkylenyl acid compound is obtained.

In Step (5), the reaction may be properly carried out only under acid conditions. A dilute to concentrated acid reaction mixture may be employed. However, it is preferred to use a concentrated reaction mixture, preferably an aliphatic acid such as acetic acid.

In Step (8), it is preferred to remove the inorganic acid formed after the acid halide preparation; otherwise, the inorganic acid would preferentially consume the subsequent addition of the hydride. However, if it is desired, the inorganic acid may remain if an excess of the hydride is used to react with the inorganic acid as well as the acid halide. The preferred hydride in this step is the tritertiarybutoxy lithium aluminum hydride. When this reagent is used, it is preferred to use temperatures below 0° C. If temperatures above 0° C. are used, the reduction will preferentially lead to the corresponding alcohol instead of the aldehyde. As indicated, although higher temperatures may be used, it is not economically feasible, for a reaction temperature will be reached wherein the corresponding alcohol will be almost exclusively produced. However, if the alcohol is desired, this is still another way of going directly from the acid to the alcohol.

In Step (9), in the preferred reaction almost any solvent could be used, as long as it is inert to the hydride (nonactive hydrogen solvent) and the respective reactants have some degree of solubility in the solvent. The acid is used in this step to convert the salt of the alcohol to the free alcohol. The excess hydride is conveniently removed for isolation purposes by either treating the reaction mixture with an active hydrogen compound, such as water, or by converting the salt to the alcohol and consumption of the hydride in one step by the cautious addition of an excess of dilute acid.

In Step (10), the quantity of acid employed is not critical as long as the acid used is a strong acid so as to catalyze the reaction. This reaction may also be carried out by employing the aldehyde and the appropriate lower alkyl orthoformate. When it is desired to isolate the acetal formed in this step and water is to be used in the isolation procedure, the reaction mixture must be neutralized with a compound such as sodium carbonate so as to prevent the hydrolysis of the acetal back to the aldehyde.

In Step (11), in the preferred reaction the yield will be affected by the amount of halide used; therefore, it is preferred to use an excess of the halide. In addition, the reaction mixture should not contain compounds with active hydrogens. Therefore, if an active hydrogen solvent from the previous step is present, such as alcohols, it must either be removed prior to the hydride addition or sufficient hydride used to first react with the active hydrogen compound and then be used for the desired reaction. However, it is preferred to first remove any active hydrogen solvent before proceeding with this step.

In Step (12), the acid may be esterified by any known means. In this reaction step, the alcohol used for esterification is normally used as the solvent also. However, when the alcohol is not suitable for use as a solvent, inert solvents are to be used along with the alcohol, as previously indicated. When using phenol as the alcohol for the esterification step, it is highly preferred to azeotrope the water formed so as to allow ester formation. Another highly suitable procedure for this esterification step is the reaction of the acid with at least one mole of a diimide (such as dicyclohexylcarbodiimide) and the appropriate alcohol in an inert solvent such as tetrahydrofuran.

In Step (13), where possible, it is preferred to use the amine itself as the solvent. When this cannot be conveniently done, an inert solvent is used wherein the respective components are fairly soluble. In addition, it is preferred to remove the excess reagent and acidic by-products formed in this reaction prior to the addition of the amine. However, the acid may be neutralized by using an excess of the desired amine. Step (12) may also be carried out as follows: A mixture of dicyclohexylcarbodiimide, an excess of the amine, and the acid itself are reacted to produce the amide. The three components are mixed at −10 to 50° C. (ambient temperatures preferred) for several hours to obtain the desired amide.

In Step (14), the reaction may be carried out using concentrated sulfuric acid as the solvent and employing an excess of fuming nitric acid and allowing the reaction to continue at temperatures below room temperatures, preferably −5° to 5° C., until the reaction is substantially complete. As indicated previously, the nitro ester compound is formed in this step. However, the ester may be converted to any of the other desired side chains (such as acid, alcohol, ether, and the like) by the reactions previously mentioned.

In Step (8) and (10), compounds containing the hydroxy, primary amino, or secondary amino group are preferably protected in some way. When it is desired to use either the hydroxy or amino groups, the compound may be benzylated before reaction Step (8). When Step (8) is carried out, the reduction will not only reduce the acid to the aldehyde, but at the same time will debenzylate the above-mentioned groups to yield the appropriate hydroxy or amino group.

Flow Sheet III is illustrative of the preferred method for producing the novel p-cycloalkyl m-substituted phenyl acetic acids, and derivatives thereof, of this invention.

FLOW SHEET III ($R_a$ and $R_m$ are as defined above, $R_c$ is lower alkyl)

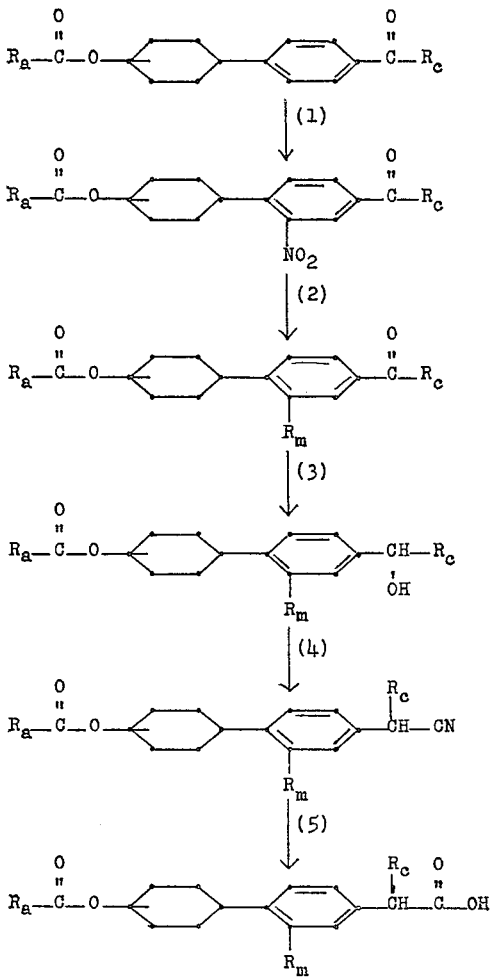

REACTIONS AND CONDITIONS

Step (1)

Nitration of the acyloxycyclohexylacetophenone using fuming nitric acid or a combination of fuming nitric acid and concentrated sulphuric acid gives, after suitable work-up, the acyloxycyclohexylnitroacetophenone.

Step (2)

Conversion of the nitro group as described here and above and specifically, for example, utilizing the catalytic reduction of the acyloxycyclohexylnitroacetophenone yields the corresponding acyloxycyclohexylaminoacetophenone which when subjected to the Sandmeyer reaction, using nitreous acid and cuprous halide, gives the corresponding acyloxycyclohexylhaloacetophenone.

Step (3)

Reduction of the keto substitute on the phenyl ring, using appropriate methods taught in the art, for example, by treatment with sodium borohydride gives the appropriate 2-(4'-acyloxycyclohexyl)-5-(α-hydroxyethyl) halo benzene.

Step (4)

The above alcohol is then converted by appropriate means into the corresponding alkyl halide, followed by cyanide displacement, for example using sodium cyanide in dimethylsulfoxide.

Step (5)

Hydrolysis of the foregoing cyano derivative to the hydroxy substituted cyclohexylphenyl organic acid, utilizing either acid or alkaline hydrolysis techniques.

From the foregoing hydroxy acid, the desired compounds of this invention can be produced. For example, by locking the acid group through the technique of esterification and conversion of the hydroxy substituent on the cyclohexyl moiety using appropriate means.

The following examples are given by way of illustration:

Example 1.—4-acetoxy-1-phenylcyclohexane

To a mixture of 30 ml. of acetic anhydride and 0.11 mole of 4-phenylcyclohexol is added, with cooling, 5 drops of concentrated sulfuric acid. The reaction mixture is stirred at room temperature for 3 hours, heated on a steam bath for one hour, then cooled and poured onto crushed ice. The oil which separates gradually solidifies and is collected by filtration. The precipitate is air dried and there is obtained 25.8 grams (99%) of 4-acetoxy-1-phenylcyclohexane.

Example 2.—4'(4"-acetoxycyclohexyl) acetophenone

To a solution of 0.11 mole of 4-acetoxy-1-phenylcyclohexane in 20 ml. of carbon disulfide is added 40 ml. of acetyl chloride. This mixture is cooled slightly and there is added portion-wise, over a period of 25 minutes, 0.28 mole of anhydrous aluminum chloride. The reaction mixture is stirred at room temperature for 1½ hours and then allowed to stir at room temperature overnight. The reaction mixture is poured onto a mixture of ice and concentrated hydrochloric acid and this mixture is then extracted well with ether. The combined ether extracts are washed with water, dried over magnesium sulfate, filtered and concentrated to an oily residue. Chromatography of this residue on 700 grams of silica gel and elution with 50% ether-petroleum ether gives 17.1 grams of 4'-(4''-acetoxycyclohexyl) acetophenone.

Example 3.—4'-(4''-acetoxycyclohexyl)-3'-nitroacetophenone

To 25 ml. of fuming nitric acid which has been cooled to −12° to 18° C., there is added portion-wise over a period of 50 minutes 0.01 mole of 4'-(4''-acetoxycyclohexyl) acetophenon. After addition is complete, the reaction mixture is stirred at −12° C. for 50 minutes and is then poured onto crushed ice. The gummy solid which forms is separated, dissolved in ether, washed with dilute bicarbonate solution, then with water and is dried over sodium sulfate. Evaporation of the solvent gives 2.8 grams of 4'-(4'-acetoxycyclohexyl)-3'-nitroacetophenone, as a yellow oil which solidifies overnight.

When 4'-(4''-acetoxycyclohexyl) propiophenone, 4'(4'-propionyloxycyclohexyl) acetophenone, 4'-(2''-acetoxycyclohexyl) acetophenone, 4'-(3''-benzoyloxycyclohexyl) acetophenone and 4'-(2'',4''-diacetoxycyclohexyl) acetophenone are used in the above example in place of 4'(4'-acetoxycyclohexyl) acetophenone, there are obtained 4'(4'' - acetoxycyclohexyl)-3'-nitropropiophenone, 4'(4'-propionyloxycyclohexyl) - 3' - nitroacetophenone, 4'(2''-acetoxycyclohexyl) - 3' - nitroacetophenone, 4'-(3''-benzoyloxycyclohexyl)-3'-nitroacetophenone and 4'(2'',4''-diacetoxycyclohexyl)-3'-nitroacetophenone.

Example 4.—4'-(4''-acetoxycyclohexyl)-3'-chloroacetophenone

A solution of 0.03 mole of 4'-(4''-acetoxycyclohexyl)-3'-nitroacetophenone, in a mixture of 80 ml. of ethanol and 80 ml. of dioxane, is reduced with hydrogen at 40 lbs. pressure in the presence of 0.3 gram of platinum oxide. When the hydrogen uptake is complete, the reaction mixture is filtered and concentrated to give a dark red oil. This oil is extracted well with ether and hydrogen chloride gas is bubbled into the extracts. The amine hydrochloride which separates is then collected by filtration.

To a well-stirred mixture of 125 ml. of concentrated hydrochloric acid and 65 ml. of water which has been cooled to −12° C. is added 7 grams of the above amine hydrochloride. Over a period of 10 minutes there is added a solution of 0.025 mole of sodium nitrite in 35 ml. of water. The reaction mixture is stirred for 15 minutes at −12° C. and then a solution of 12.5 grams of cuprous chloride in 125 ml. of a 1:1 mixture of concentrated hydrochloric acid and water is added. The reaction mixture is kept at −5° C. for 45 minutes then allowed to warm slowly to room temperature and is stirred for 4½ hours at room temperature. The reaction mixture is diluted with 250 ml. of water and extracted well with ether. The combined ether extracts are washed well with water, dried magnesium sulfate and concentrated to yield 5.7 grams of an oil. Chromatography of this oil on 300 grams of silica gel and elution with 20 to 40% ether-petroleum ether gives 2.88 grams of 4'-(4''-acetoxycyclohexyl)-3'-chloroacetophenone.

When hydrobromic acid and cuprous bromide are used in place of hydrochloric acid and cuprous chloride in the above example, there is obtained 4'-(4''-acetoxycyclohexyl)-3'-bromoacetophenone. When 4'-(4''-acetoxycyclohexyl)-3'-nitropropiophenone, or 4'-(4''-butyryloxycyclohexyl)-3'-nitropropiophenone, are used in the above example in place of 4'-(4''-acetoxycyclohexyl)-3'-nitroacetophenone, there are obtained 4'-(4''-acetoxycyclohexyl)-3'-chloropropiophenone, and 4'-(4''-butyryloxycyclohexyl)-3'-chloropropiophenone.

Example 5.—2-(4'-acetoxycyclohexyl)-5-(α-hydroxyethyl)-chlorobenzene

To a solution of 0.2 mole of 4'-(4''-acetoxycyclohexyl)-3'-chloroacetophenone in 3 liters of ethanol, which has been cooled to about 5° C., is added portion-wise 0.12 mole of sodium borohydride over a period of 30 minutes. The reaction mixture is kept overnight at about 5° C. and is then poured onto a mixture of ice and water and is acidified with dilute hydrochloric acid. This mixture is extracted well with ether, the combined ether extracts are washed well with water and dried over sodium sulfate. The solvent is removed in vacuo to yield 57 grams of 2-(4'-acetoxycyclohexyl) - 5 - (α-hydroxyethyl)-chlorobenzene.

Example 6.—2-(4'-[4''-acetoxycyclohexyl]-3'-chlorophenyl)-propionitrile

To a mixture of 0.007 mole of 2-(4'-acetoxycyclohexyl)-5-(α-hydroxyethyl)-chlorobenzene and 20 ml. of dry benzene is added with cooling, 45 ml. of thionyl chloride. The reaction mixture is heated on the steam bath for 6½ hours and allowed to stand overnight at room temperature. The solvent is then removed in vacuo and the residue is concentrated two more times from fresh benzene. To the residue is added 5 ml. of dry dimethylsulfoxide and this mixture is heated in an oil bath at a temperature of 42° C. There is then added 0.008 mole of sodium cyanide. The temperature is raised slowly to 85° C. and the reaction material is kept at this temperature for 4½ hours and then allowed to stand at room temperature overnight. The reaction mixture is poured onto ice and extracted well with ether. The combined ether extracts are washed with water, dried over magnesium sulfate and concentrated to yield 2.48 grams of 2-(4'-[4''-acetoxycyclohexyl] - 3' - chlorophenyl)-propionitrile, as a deep red oil.

Example 7.—2-(3'-chloro-4'-[4''-hydroxycyclohexyl]-phenyl)-propionic acid

To a solution of 0.0015 mole of 2-(4'-[4''-acetoxycyclohexyl]-3'-chlorophenyl)-propionitrile in 30 ml. of methanol is added a solution of 1 gram of potassium hydroxide in 7 ml. of water. The reaction mixture is refluxed for 24 hours, then diluted with water, cooled and extracted with ether. The aqueous layer is acidified with 2.5 normal hydrochloric acid and the resulting cloudy mixture is extracted well with ether. The combined ether extracts are washed well with water, dried over sodium sulfate and concentrated to yield 2-(3'-chloro-4'-[4''-hydroxycyclohexyl]-phenyl)-propionic acid, as an oil which gradually solidifies. Recrystallization from ether-hexane gives 135 mg. of a white solid, melting point 147°–150° C.

Example 8.—Methyl 2-(3'-chloro-4'-[4''-hydroxycyclohexyl]-phenyl)-propionate

To a solution of 2.5 grams of 2-(3'-chloro-4'-[4''-hydroxycyclohexyl]-phenyl)-propionic acid in 30 ml. of cooled methanol is added an excess of a cool etheral solution of diazomethane. The reaction mixture is stirred for 30 minutes and the excess diazomethane and ether is removed in a stream of nitrogen. The resulting solution is concentrated to a small volume, ether is added and the resulting solution washed with potassium bicarbonate solution, then water, and then dried over sodium sulfate. Removal of the solvent gives 2.5 grams of methyl-2-(3'-chloro-4'-[4''-hydroxycyclohexyl]-phenyl)-propionate, as an oil.

Example 9.—Methyl 2-(3'-chloro-4'-[4''-ketocyclohexyl]-phenyl)-propionate

To a solution of 0.03 mole of methyl-2-(3'-chloro-4'-[4''-hydroxycyclohexyl]-phenyl)-propionate in 300 ml. of dry pyridine is added 0.03 mole of lead tetraacetate. The reaction mixture is stirred overnight at room temperature. Ethylene glycol, 5 ml., is added and this mixture is stirred for 30 minutes. It is then poured onto a mixture of ice and dilute hydrochloric acid and extracted well with ether. The combined ether extracts are washed with dilute hydrochloric acid, water and then dried over magnesium sulfate. Filtration, followed by removal of the solvent in vacuo gives 10.2 grams of methyl 2-(3'-chloro-4'-[4''-ketocyclohexyl]-phenyl)-propionate, as a yellow oil.

Example 10.—Methyl 2-(3'-chloro-4'-[4''-isonitrosocyclohexyl]-phenyl)-propionate 2.55 grams of methyl-2-(3'-chloro - 4' - [4''-ketocyclohexyl]-phenyl)-propionate is dissolved in 30 ml. of a 1:1 mixture of pyridine and methanol. There is added 2.55 grams of hydroxylamine hydrochloride and this reaction mixture is then refluxed for 3½ hours. The reaction mixture is poured onto crushed ice and extracted well with ether. The combined ether extracts are washed with dilute hydrochloric acid, water and then dried over sodium sulfate. Filtration, followed by removal of the solvent in vacuo yields 2.6 grams of methyl 2-(3'-chloro-4'-[4''-isonitrosocyclohexyl]-phenyl)-propionate, as an oil which gradually solidifies.

Example 11.—Methyl 2-(4'-[4''-aminocyclohexyl]-3'-chlorophenyl)-propionate

A solution of 4 grams of methyl 2-(3'-chloro-4'-[4''-isonitrosocyclohexyl]phenyl)-propionate in 140 ml. of methanol is reduced with hydrogen at 40 lbs. pressure in the presence of 3 grams of a 5% rhenium on carbon catalyst. After the uptake of hydrogen is complete, the reaction mixture is filtered and the filtrate concentrated to give an oil. This oil is dissolved in ether and the ether solution then extracted with 2 portions of 2.5 normal hydrochloric acid. The combined acid extracts are washed with ether, filtered and then made alkaline with solid potassium carbonate. The resulting mixture is extracted with methylene chloride, dried over potassium carbonate, filtered and concentrated to give 0.9 gram of an oil. Chromatograhpy on 50 grams of basic alumina and elution with methanol in methylene chloride (1 to 5% gives 0.5 gram of methyl 2-[4'-aminocyclohexyl]-3'-chlorophenyl)-propionate.

Example 12.—2-(3'-chloro-4'-[Δ³-cyclohexenyl]-phenyl)-propionic acid

To a solution of 0.005 mole of methyl 2-(3'-chloro-4'-[4''-hydroxycyclohexyl]-phenyl)-propionate in 13 ml. of dry pyridine is added, with cooling, 3 ml. of phosphorous oxychloride. The reaction material is stirred at room temperature overnight and is then carefully poured onto amixture of ice and dilute hydrochloric acid. The resulting mixture is extracted well with ether. The combined ether extracts are washed with water, dried over magnesium sulfate, filtered, and concentrated to give an oil. This oil is dissolved in 25 ml. of methanol and a solution of 0.5 mole of potassium hydroxide in 3.5 ml. of water is added. The reaction mixture is stirred overnight at room temperature, then diluted with water and extracted with ether. The aqueous layer is acidified with 2.5 normal hydrochloric acid and the resulting cloudy mixture is extracted well with methylene chloride. The combined organic layers are washed with water, dried over magnesium sulfate, filtered and concentrated to 0.9 gram of a pale yellow oil, which gradually solidifies. Recrystallization from hexane gives .55 gram of 2-(3'-chloro-4'-[Δ³ - cyclohexyl] - phenyl) - propionic acid, melting point 96°–101° C.

Example 13.—Methyl 2-(3'-chloro-4'-[4''-methoxycyclohexyl]-phenyl)-propionate

To a well-stirred suspension of 0.01 mole of sodium hydride in 25 ml. of dry dimethylformamide, which has been cooled to 0° C., is added dropwise a solution of 0.01 mole of methyl 2-(3'-chloro-4'-[4''-hydroxycyclohexyl]-phenyl)-propionate in 10 ml. of dimethylformamide. The reaction mixture is stirred for 15 minutes and 0.015 mole of methyl iodide is then added dropwise. The mixture is allowed to stir overnight at room temperature.

200 ml. of water is added and the resulting mixture is extracted well with ether. The combined ether extracts are washed well with water, dried over sodium sulfate, and concentrated. The residue is chromatographed on 250 grams of silica gel and eluted with ether-petroleum ether (10–80%) to yield methyl-2-(3'-chloro-4'-[4''-methoxycyclohexyl]-phenyl)-propionate.

Example 14.—Methyl 2-(3'-chloro-4'-[4''-methylaminocyclohexyl]-phenyl)-propionate; methyl 2-(3'-chloro-4'-[4''-dimethylaminocyclohexyl]-phenyl)-propionate To a solution of 0.01 mole of methyl 2-(4'-[4''-aminocyclohexyl]-3-chlorophenyl)-propionate in 100 ml. of benzene is added 0.015 mole of methyl iodide. The reaction mixture is stirred overnight at room temperature, filtered and concentrated. The residue is chromatographed on 300 gm. of silica gel and eluted with ether-petroleum ether (5–90%) to give methyl 2-(3'-chloro-4'-[4''-methylaminocyclohexyl] - phenyl) - propionate, methyl 2-(3'-chloro-4'-[4''-dimethylaminocyclohexyl] and methyl 2-(3'-chloro-4'-[4'' - dimethylaminocyclohexyl]-phenyl)-propionate.

What is claimed is:

1. A compound having the formula:

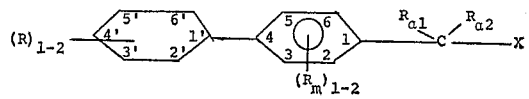

where
R is a lower alkoxy hydroxy, keto, amino, alkylamino, or
an olefinic double bond between the 3'- and 4'-positions of the cyclohexyl moiety;
there being no more than one R group at any one positon on the cyclohexyl ring;
$R_m$ is halo or nitro;
$R_{a1}$ is hydrogen;
$R_{a2}$ is lower alkyl and when taken together $R_{a1}$ and $R_{a2}$ are methylene;
X is COOH, or COOR' where R' is lower alkyl or arlower alkyl and the pharmaceutically acceptable non-toxic salts of the foregoing.

2. A compound of the formula:

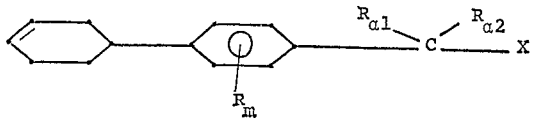

where
$R_{a1}$ is hydrogen
$R_{a2}$ is lower alkyl
$R_m$ is halo or nitro
X is COOH and its pharmaceutically acceptable non-toxic salts, and COOR' where R' is lower alkyl or phenyl.

3. A compound according to claim 1 where
R is hydroxy
$R_m$ is halo
$R_{a2}$ is lower alkyl
X is COOH and its pharmaceutically acceptable non-toxic salts, and COOR' where R' is lower alkyl.

4. The (d) form a compound of the formula:

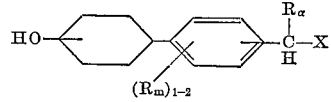

wherein
$R_m$ is halo;
$R_\alpha$ is lower alkyl;

X is COOH, the pharmaceutically acceptable salts of the acid and COOR wherein R is lower alkyl.

5. A compound according to claim 1 where R is an olefinic double bond between the 3'- and 4'-positions of the cyclohexyl moiety.

6. The (d) form of the compound of claim 1.
7. The (d) form of the compound of claim 5.
8. The compound of claim 1 where R is hydroxy.
9. 2-(3'-chloro-4'-[4" - hydroxycyclohexyl] - phenyl)-propionic acid.
10. The (d) form of the compound of claim 9.
11. 2-(3'-chloro - 4 - [Δ³-cyclohexenyl] - phenyl)-propionic acid.
12. d-2-(3'-chloro-4'-[Δ³ - cyclohexenyl] - phenyl)-propionic acid.

References Cited
UNITED STATES PATENTS

| | | | |
|---|---|---|---|
| 2,650,243 | 8/1953 | Novello | 260—473 X |
| 2,726,260 | 12/1955 | Novello | 260—520 X |
| 3,228,831 | 1/1966 | Nicholson et al. | 260—515 X |

LORRAINE A. WEINBERGER, Primary Examiner

M. G. BERGER, Assistant Examiner

U.S. Cl. X.R.

260—247.1, 247.2, 268, 293.4, 294, 326.3, 439, 448, 465, 469, 470, 471, 472, 473, 476, 477, 488, 516, 518, 519, 520, 558, 559, 570.5, 571, 590, 599, 600, 611, 618, 999

PO-1050
(5/69)

UNITED STATES PATENT OFFICE
CERTIFICATE OF CORRECTION

Patent No. 3,457,300      Dated July 22, 1969

Inventor(s) Conrad P. Dorn and Tsung-Ying Shen

It is certified that error appears in the above-identified patent and that said Letters Patent are hereby corrected as shown below:

In the claims,

Column 18, line 32, insert a --,-- after the word 'alkoxy'.

Column 18, line 67, insert the word --of-- after the word 'form'.

SIGNED AND
SEALED

DEC 2 - 1969

(SEAL)
Attest:

Edward M. Fletcher, Jr.
Attesting Officer

WILLIAM E. SCHUYLER, JR.
Commissioner of Patents